(12) United States Patent
Benderius et al.

(10) Patent No.: US 12,254,666 B2
(45) Date of Patent: Mar. 18, 2025

(54) METHOD AND SYSTEM FOR STRAY LIGHT COMPENSATION

(71) Applicant: Axis AB, Lund (SE)

(72) Inventors: Björn Benderius, Lund (SE); Gunnar Dahlgren, Lund (SE); Andreas Muhrbeck, Lund (SE)

(73) Assignee: AXIS AB, Lund (SE)

( * ) Notice: Subject to any disclaimer, the term of this patent is extended or adjusted under 35 U.S.C. 154(b) by 346 days.

(21) Appl. No.: 17/943,257

(22) Filed: Sep. 13, 2022

(65) Prior Publication Data

US 2023/0104411 A1 Apr. 6, 2023

(30) Foreign Application Priority Data

Oct. 6, 2021 (EP) .................................... 21201110

(51) Int. Cl.
| | |
|---|---|
| *G06V 10/25* | (2022.01) |
| *G06T 5/50* | (2006.01) |
| *G06V 10/44* | (2022.01) |
| *G06V 10/60* | (2022.01) |
| *G06V 10/74* | (2022.01) |

(52) U.S. Cl.
CPC .............. *G06V 10/60* (2022.01); *G06T 5/50* (2013.01); *G06V 10/25* (2022.01); *G06V 10/449* (2022.01); *G06V 10/761* (2022.01); *G06T 2207/20221* (2013.01)

(58) Field of Classification Search
CPC ........... G06V 10/60; G06V 10/25; G06T 5/50
See application file for complete search history.

(56) References Cited

U.S. PATENT DOCUMENTS

| | | |
|---|---|---|
| 2009/0059210 A1 | 3/2009 | Zong et al. |
| 2010/0135594 A1 | 6/2010 | Allebach et al. |
| 2016/0316155 A1 | 10/2016 | Richards |
| 2017/0070689 A1 | 3/2017 | Silverstein et al. |
| 2017/0359534 A1 | 12/2017 | Li et al. |
| 2018/0352165 A1 | 12/2018 | Zhen et al. |
| 2019/0260978 A1 | 8/2019 | Guerin et al. |

FOREIGN PATENT DOCUMENTS

| | | |
|---|---|---|
| CN | 110622497 A | 12/2019 |
| WO | 2021/138867 A1 | 7/2021 |

OTHER PUBLICATIONS

Extended European Search Report dated Mar. 7, 2022 for European Patent Application No. 21201110.0.
Huang et al., "Directional polarimetric camera stray light analysis and correction," Appl. Opt. 58, 7042-7049 (2019).
Chinese Office Action issued on Sep. 13, 2024 for Chinese Patent Application No. 202211208665.2.

*Primary Examiner* — Sam Bhattacharya
(74) *Attorney, Agent, or Firm* — Volpe Koenig

(57) ABSTRACT

A method for stray light compensation is disclosed. The method comprising: acquiring a first image with a first imaging device covering a first field-of-view; acquiring a second image with a second imaging device covering a second field-of-view, wherein the second field-of-view is larger than the first field-of-view and wherein the first field-of-view is included in the second field-of-view; estimating stray light components in pixels of the first image from pixel data of pixels in the second image; and compensating for stray light in the first image by subtracting the estimated stray light components in pixels of the first image. Also, a system for stray light compensation is disclosed.

15 Claims, 3 Drawing Sheets

METHOD AND SYSTEM FOR STRAY LIGHT COMPENSATION

FIELD OF INVENTION

The present disclosure relates to stray light compensation, especially stray light compensation in an image captured by a digital camera.

TECHNICAL BACKGROUND

Stray light is light in an optical system, such as a camera, which was not intended in the design. The stray light may originate from the intended source, but follow paths other than intended, or it may be from a source other than the intended source. Stray light may also be referred to as lens flare. Lens flare occurs when light is scattered or flared in a lens arrangement. More precisely, light is scattered by the lens arrangement itself, for example through internal reflection and forward scattered from material imperfections in lenses of the lens arrangement. Lens flare can make the image look "washed out" by reducing contrast and color saturation (adding light to dark image regions, and adding white to color saturated regions, reducing their saturation). Lens flare is particularly caused by bright light sources. Hence, lens flare is a secondary effect that is widely distributed across the image and typically not visible, although a does reduce signal-to-noise ratio, i.e., contrast, in the image. Accordingly, lens flare sets a working limit on a dynamic range in an image. Especially, a level of detail in darker portions of an image is limited by the lens flare.

There is a need for either reducing lens flare/stray light or by some means compensating for the lens flare/stray light being present in the image.

SUMMARY

In view of the above, it is an object of the present disclosure to Providing compensation for the stray light being present in an image, especially in a digital image, would be beneficial. Additionally, mitigating, alleviating or eliminating one or more of the above-identified deficiencies in the art and disadvantages singly or in any combination and solve at least the above-mentioned problem would also be an improvement over current systems.

According to a first aspect, a method for stray light compensation is provided. The method comprises: acquiring a first image with a first imaging device covering a first field-of-view; acquiring a second image with a second imaging device covering a second field-of-view, wherein the second field-of-view is larger than the first field-of-view and wherein the first field-of-view is included in the second field-of-view; estimating stray light components in pixels of the first image from pixel data of pixels in the second image; and compensating for stray light in the first image by subtracting the estimated stray light components in pixels of the first image. Thereby an improved first image with a reduction of stray light therein is provided. It is to be noted that, even if the above discussed stray light compensation is not perfectly calibrated, the applied stray light compensation can still be valuable since the stray light compensation provides for an improved signal-to-noise ratio in the first image. Hence, an increase in dynamic range in the first image is provided. A possible effect of the present stray light compensation is that it provides compensation for stray light originating from light sources outside the field-of-view of the first imaging device. This since such stray light components are estimated from the second image captured by the second imaging device having a larger field-of-view than the first imaging device.

Estimating stray light components in pixels of the first image may comprise: filtering the second image by a series of gaussian filters forming a series of filtered second images; and linearly combining the filtered second images forming a stray light image comprising stray light components from pixels in the first image.

Estimating stray light components in pixels of the first image may comprise one or more of: determining a portion of the second image overlapping the first image; compensating for a difference in exposure between the second image and the first image; compensating for difference in gain settings of the first imaging device and the second imaging device; compensating for difference in pixel density between the second image and the first image; compensating for difference in view angle between the second image and the first image; and compensating for difference in aperture settings of the first and second imaging devices.

According to a second aspect, a non-transitory computer-readable storage medium is provided. The non-transitory computer-readable storage medium having stored thereon instructions for implementing the method according to the first aspect, when executed on a device having processing capabilities.

According to a third aspect, a system for stray light compensation is provided. The system comprises: a first imaging device covering a first field-of-view and being configured to acquire a first image; a second imaging device covering a second field-of-view and being configured to acquire a second image, wherein the second field-of-view is larger than the first field-of-view and wherein the first field-of-view is included in the second field-of-view; and circuitry configured to execute a stray light compensation function. The stray light compensation function being configured to: estimate stray light components in pixels of the first image from pixel data of pixels in the second image; and compensate for stray light in the first image by subtracting the estimated stray light components in pixels of the first image.

A resolution of the second imaging device may be lower than a resolution of the first imaging device.

The first and second imaging devices may be configured to capture the first and second images simultaneously.

The second imaging device may be configured to capture the second image so that so that it is less saturated than the first image.

The second imaging device may comprise a fixed focal lens arrangement.

The second imaging device may be separate from the first imaging device.

According to a fourth aspect a video camera comprising the system according to the third aspect is provided.

The above-mentioned features of the method, when applicable, apply to the second, third or fourth aspects as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the system described or acts of the methods described as such system and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a device" or "the device" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

Figure 1:
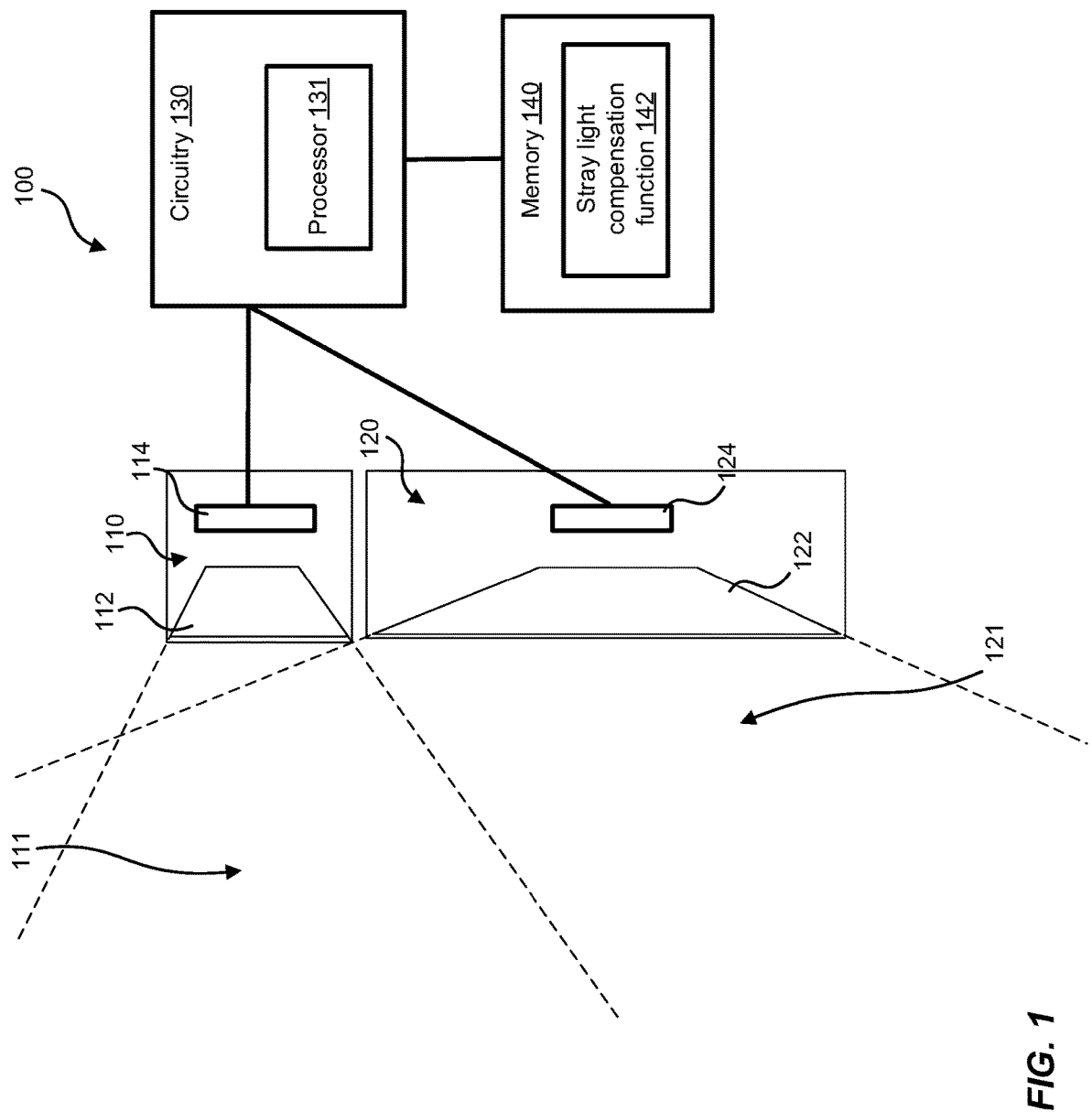
FIG. 1 illustrates a system for stray light compensation.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

A point spread function describes how an optical system depicts an ideal point light source, i.e., the impulse response of the system. A modulation transfer function is the Fourier transform of the point spread function, i.e., the frequency response of the system. In the case of an ideal lens (disregarding diffraction) the point spread function will be an infinitely narrow impulse, the Fourier transform of an impulse is 1 for all frequencies (i.e., all frequencies are unchanged by the system). So, for a perfectly focused ideal lens, all the light emanating from a single point in the scene will hit a single point on the sensor. In reality, the point spread function never will be infinitely narrow, some light will always hit neighboring pixels, a small percentage of the light will even hit pixels far away. In the frequency domain this can be seen as a gradual roll-off for higher frequencies in the frequency response modulation transfer function. For a real lens the point spread function varies depending on a lot of factors, e.g., the color of the light, the offset from the optical axis and the depth of field. Developing a lens will be a compromise between cost and performance so that the lens can be optimized for handling "normal" scenes sufficiently well, i.e., the point spread function is supposed to be narrow enough to produce a good enough image in typical situations.

As the boundaries of high dynamic range imaging are pushed, the requirements on the lenses increase. A high dynamic range scene typically contains at least some part that is significantly brighter than the rest of the scene. Since the point spread function is not ideal, some of the light from the bright areas will be spread to neighboring darker pixels resulting in an unwanted offset in those pixels, reducing the contrast of the actual signal in dark areas. Even if only a small fraction of the light from the bright areas is spread to the dark areas, it might mean a significant contribution to these areas. This effect obviously becomes worse as the dynamic range, i.e., ratio between bright and dark, increases. This loss of contrast in dark areas neighboring bright areas can be seen as a first order limitation of the dynamic range of the lens, as it limits the ability to measure contrast in dark areas. In theory, if we have perfect knowledge of the point spread function, it might be possible to reconstruct the ideal image by doing a deconvolution, i.e., inverse convolution, using the point spread function. However, even if a perfect subtraction of the stray light offset is managed, it would still suffer from the photon shot noise introduced by the stray light, i.e., due to photon shot noise there is a physical limitation of the dynamic range possible to measure for a given lens system. This can of course be circumvented by collecting more photons, thereby reducing the temporal and/or spatial resolution instead.

If we had access to the ideal, i.e., stray light free, image it would be fairly simple to estimate the stray light, it would just be a matter of convolving the ideal image with the point spread function. Unfortunately, there is no access to the ideal image, so instead an actual image approximation may be used. This might seem counterintuitive at first, but considering:

psf—The point spread function
$im_{ideal}$—The ideal image without any stray light
$im_{stray}$—The stray light offset per pixel
$im_{actual}$—The image actually measured on the sensor
From the definitions above:
$im_{actual} = im_{ideal} + im_{stray}$
It would be ideal to calculate: $im_{stray} = im_{ideal} * psf - im_{ideal}$
Alternatively, with the information that is available calculate: $im_{actual} * psf - im_{ideal} + im_{stray} * psf - im_{stray} = im_{stray} + im_{stray} * psf - im_{stray} = im_{stray} * psf \approx im_{stray}$ In other words, by approximating $im_{ideal}$ by $im_{actual}$ the stray light is overestimated a bit since it was erroneously assumed it too contributes to the stray light, since it is convolved by the point spread function. Note that this in theory can be improved iteratively by refining the approximation of $im_{ideal}$ in each iteration by subtracting the previously estimated $im_{stray}$ from $im_{actual}$.

Additionally, the issue of performing a full resolution perfect psf-convolution is extremely expensive and completely unrealistic. Instead, it is assumed that the point spread function can be sufficiently well approximated by a sum of gaussian filters of varying width, i.e., by filtering the actual image by a series of gaussian filters that can reconstruct an approximation of the stray light as a linear combination of the filter results.

Hence, for a given lens arrangement, the point spread function which describes how light is spread by the lens arrangement can be estimated. The point spread function can then be used to predict the amount of stray light in an image captured using the lens arrangement. A limiting factor when estimating the stray light this way is that only light actually seen by the lens arrangement can be measured, light originating from light sources outside of the field-of-view cannot be handled.

The present disclosure is based on the insight made by the inventors that an estimation of stray light in pixels of an image captured by a first imaging device can be made from an image captured by another second imaging device. The second imaging device is set to have a larger field-of-view than the first imaging device. The field-of-view of the first imaging device is to be included in the field-of-view of the second imaging device. Further, typically, the second imaging device is set to capture images being less exposed than the images captured by the first imaging device. According to this, stray light components in an image captured by a first imaging device originating from light sources outside the field-of-view of the first imaging device may be estimated and compensated for. Hence, the disclosure is based on having a separate second imaging device with a wider field-of-field to acquire an image of a larger portion of a scene covered by a first imaging device. Further, the separate second imaging device is preferably configured so that the images captured thereby and being used for estimating stray light in an image captured by the first imaging device are without saturating light sources. This may e.g., be safeguarded by using a different (typically lower) exposure for images captured by the second imaging device than for images captured by the first imaging device. An image captured by the second imaging device can then be used to estimate and subtract stray light from an image captured by the first imaging device. The second imaging device may be a camera having a lower resolution than the first imaging device. This is since typically, the stray light components originating from light sources outside the field-of-view of the first imaging device are of spatially low frequency. Further, the second imaging device may even be a camera with fixed focal-length optics.

FIG. 1 illustrates a system 100 for stray light compensation. The system 100 comprises a first imaging device 110 and a second imaging device 120. The first and second imaging devices 110, 120 are typically separate imaging devices. The first and second imaging devices 110, 120 may be arranged in one and the same housing, i.e., a camera device having two imaging devices arranged therein. Alternatively, the first and second imaging devices 110, 120 may be separate devices, i.e., separate camera devices. Each imaging device 110, 120 comprises a lens arrangement 112, 122 and an image sensor 114, 124. That is, the first and second imaging devices 110, 120 are typically digital cameras. The lens arrangement 122 of the second imaging device 120 may be a fixed focal lens arrangement. The lens arrangement 112 of the first imaging device 110 may be a zooming lens arrangement. The first imaging device 110 covers a first field-of-view 111. The second imaging device 120 covers a second field-of-view 121. The second field-of-view 121 is larger than the first field-of-view 111. The first field-of-view 111 is included in the second field-of-view 121. The first imaging device 110 is configured to capture one or more first images. Hence, the first imaging device 110 may be a still image camera or a video camera. The second imaging device 110 is configured to capture one or more second images. Hence, the second imaging device 120 may be a still image camera or a video camera. A resolution of the second imaging device 120 may be lower than a resolution of the first imaging device 110.

The second field-of-view 121 is preferably of a size arranged so that the second imaging device 120 reproduce all light sources from which light reaches the first imaging device 110.

The second imaging device 120 is preferably configured to capture the second image so that pixels of the second image are less exposed than pixels of the first image. Doing so facilitates capturing of a second image having less saturated pixels that the first image. Hence, the second image preferably has less saturated pixels than the first image. According to a non-limiting example, the second imaging device 120 is configured to capture the second image so that at least 99% of the pixels of the second image are unsaturated. Hence, it may be safeguarded that a low number of pixels in the second image are saturated. This provides for an improved stray light estimation. In order to achieve this, the second imaging device 120 is typically set to use a shorter exposure time than the first imaging device 110. Additionally, other settings in the second imaging device 120 may be used for safeguarding that a low number of pixels in the second image is saturated. Some non-limiting examples are: using a less sensitive image sensor in the second imaging device 120; adjust the aperture of the second imaging device 120; and use an optical filter, such as a neutral density filter, in the second imaging device 120. The second imaging device 120 may further be configured to capture the second image(s) as dual exposure images. The second imaging device 120 may even be a black and white camera. This since the quality of the image(s) captured by the second imaging device 120 is not of great importance as long as the images(s) captured thereby gives information pertaining to position and illuminance of light-sources outside the field of view of the first imaging device 110.

According to one exemplifying embodiment, the first imaging device 110 is a detailed-view imaging device and the second imaging device 120 is a wide-angle imaging device. The detailed-view imaging device is covering a detailed field-of-view and being configured to capture one or more detailed-view images. The wide-angle imaging device covers a wide field-of-view and being configured to capture one or more wide-angle images. The wide field-of-view is larger than the detailed field-of-view. The detailed field-of-view is included in the wide field-of-view.

The system 100 further comprises circuitry 130. The circuitry 130 is configured to carry out overall control of functions and operations of the system 100. The circuitry 130 may include a processor 131, such as a central processing unit (CPU), microcontroller, or microprocessor. The processor 131 is configured to execute program code stored in a memory 140, in order to carry out functions and operations of the system 100.

The memory 140 may be one or more of a buffer, a flash memory, a hard drive, a removable medium, a volatile memory, a non-volatile memory, a random access memory (RAM), or another suitable device. In a typical arrangement, the memory 140 may include a non-volatile memory for long term data storage and a volatile memory that functions as system memory for the circuitry 130. The memory 140 may exchange data with the circuitry 130 over a data bus. Accompanying control lines and an address bus between the memory 140 and the circuitry 130 also may be present.

Functions and operations of the system 100 may be embodied in the form of executable logic routines (e.g., lines of code, software programs, etc.) that are stored on a non-transitory computer readable medium (e.g., the memory 140) of the system 100 and are executed by the circuitry 130 (e.g., using the processor 131). Furthermore, the functions and operations of the system 100 may be a stand-alone software application or form a part of a software application that carries out additional tasks related to the system 100. The described functions and operations may be considered a method that the corresponding part of the system is configured to carry out. Also, while the described functions and operations may be implemented in software, such functionality may as well be carried out via dedicated hardware or firmware, or some combination of hardware, firmware and/or software.

The circuitry 130 is configured to execute a stray light compensation function 142. The stray light compensation function 142 is configured to estimate stray light components in pixels of an image captured by the first imaging device 110, the image captured by the first imaging device 110 will below be referred to as the first image. Such estimation is set to be made based on pixel data of pixels in an image captured by the second imaging device 120, the image captured by the second imaging device 120 will below be referred to as the second image. More precisely, the estimation is made such that pixel data in a second image is manipulated so that the pixel data indicative of stray light components in the first image originating from light sources outside the field-of-view of the first imaging device 110 may be estimated for. For example, the second image may be manipulated by: filtering the second image by a series of gaussian filters forming a series of filtered second images; and linearly combining the filtered second images forming a stray light image comprising stray light components from pixels in the first image. The gaussian filters used may be empirically evaluated for the system 100, i.e., by iteration. Hence, a selection of gaussian filters to use can be found by calibration of the system 100. Accordingly, stray light components for pixels in the first image may be estimated from pixel values in the second image.

The estimation of stray light components in pixels of the first image may further depend on other factors. Some non-limiting examples are: an overlap in field-of-view between the first and second image; exposures of the first and second images; gain settings of the first and second imaging devices 110, 120; pixel densities of the first and second images; view angles of the first and second imaging devices 110, 120; focus settings of the first and second imaging devices 110, 120; and aperture settings of the first and second imaging devices 110, 120.

All-in-all, stray light components for pixels in the first image may be found by applying a transfer function on pixel values of pixels in the second image; such a transfer function transferring how pixel values of pixels in the second image influence stray light in the first image. That is, a transfer function may be applied on pixel values of pixels in the second image transferring how stray light is affecting pixels in the first image. Such a transfer function may be depending on one or more of the factors discussed above. The transfer function may be empirically evaluated for the system 100 i.e., by iteration. Hence, the transfer function to use for the system 100 can be found by calibration of the system 100.

The stray light compensation function 142 is further configured to compensate for stray light in the first image by subtracting the estimated stray light components in pixels of the first image. Thereby an improved first image with a reduction of stray light therein is provided.

Figure 3:
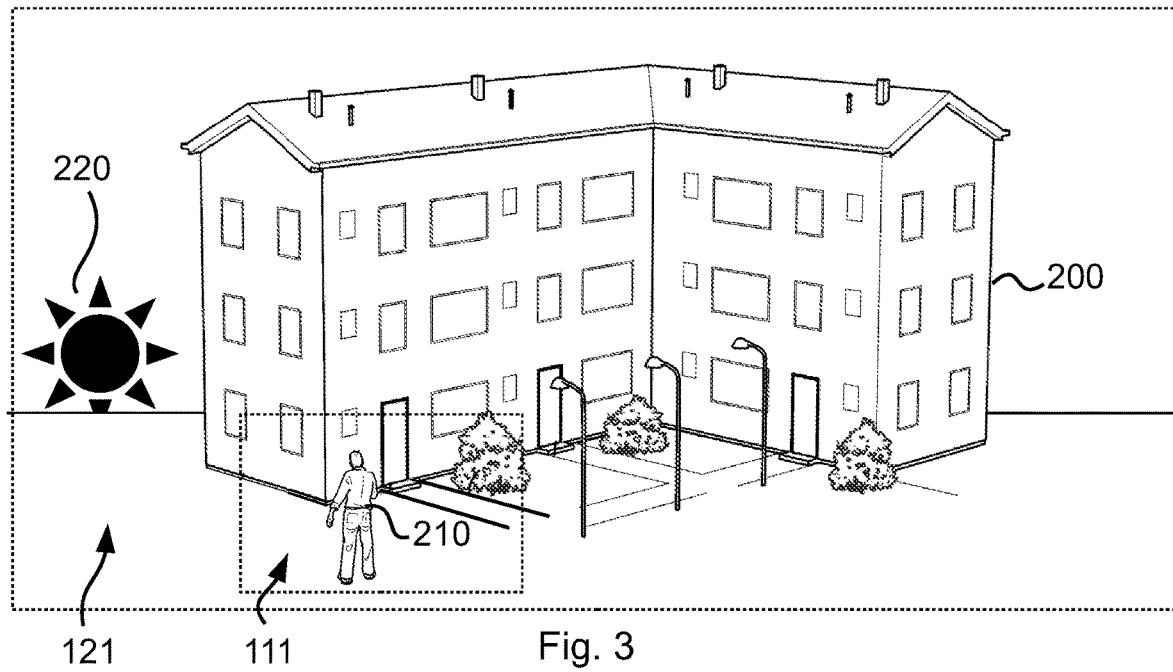
FIG. 3 is a view of the scheme of FIG. 2.
Figure 2:
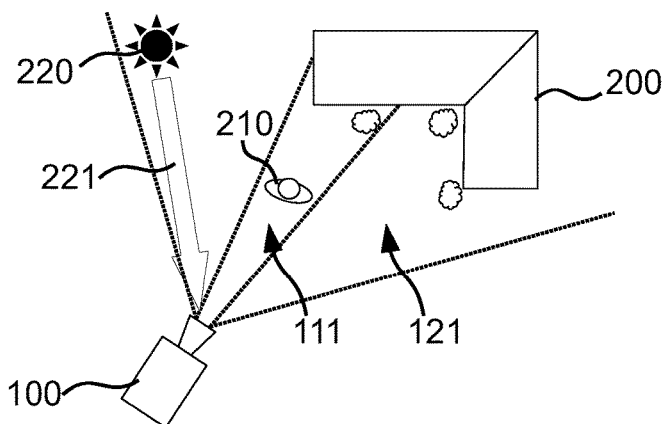
FIG. 2 is a schematic view from above of the system for stray light compensation looking at a scene.
Figure 4B:
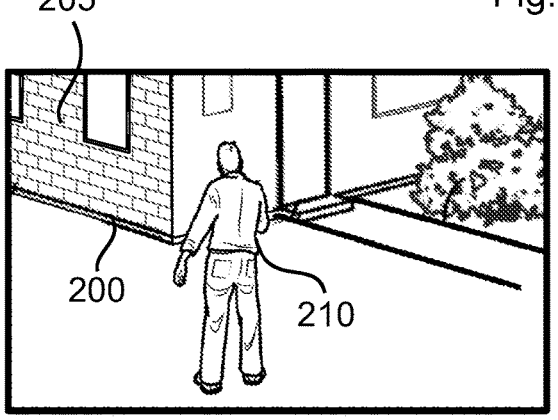
FIG. 4B is the same view as in FIG. 4A after stray light compensation has been applied.
Figure 4A:
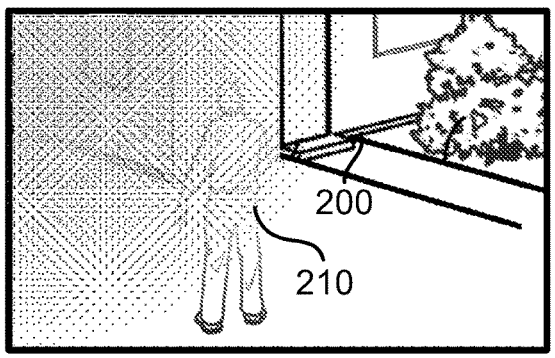
FIG. 4A is a view of the scene in FIG. 3 taken by a first imaging device of the system for stray light compensation before stray light compensation has been applied.

Application of the system 100 for stray light compensation will now be discussed in connection with FIGS. 2, 3, 4A and 4B. In FIG. 2 the system 100 for stray light compensation looking at a scene comprising a building 200, a person 210 and a light source 220 is illustrated from above. In this specific example, the light source 220 is the sun. In FIG. 3 the scene of FIG. 2 is illustrated as depicted by the first imaging device 110 having the first field-of-view 111 and by the second imaging device 120 having the second field-of-view 121. The first field-of-view 111 is illustrated as covering the person 210 and a portion of the building 200. Important to notice is that the light source 220 is outside of the field-of-view 111 of the first imaging device 110. The second field-of-view 121 is illustrated as covering the person 210 the building 200 and the light source 220. In FIG. 4A an image captured by the first imaging device 110 is illustrated before straylight compensation has been performed. In FIG. 4B the image of FIG. 4A after straylight compensation has been performed is illustrated.

As will be discussed in connection with FIGS. 2, 3 and 4A the light source 220 outside of the field-of-view 111 of the first imaging device 110 affects the image captured by the first imaging device 110. As is schematically illustrated by arrow 221 in FIG. 2, light originating from the light source 220 outside of the field-of-view 111 of the first imaging device 110 will arrive at the first imaging device 110. Such light will affect image(s) captured by the first imaging device 110 as stray light/lens flare. An example of an image captured by the first imaging device 110 is illustrated in FIG. 4A. In FIG. 4A stray light originating from the light source 220 outside of the field-of-view 111 of the first imaging device 110 is affecting the image mostly in the upper left portion of the image. The effect of the stray light is illustrated in FIG. 4A as dotted pattern. The dotted pattern illustrates the noise introduced in the image due to stray light originating from the light source 220 outside of the field-of-view 111 of the first imaging device 110.

In FIG. 4B the image illustrated in FIG. 4A after applying the stray light compensation function 142 is illustrated. As illustrated in FIG. 4B, after having compensated for stray light using the stray light compensation function 142, signal-to-noise ratio in the image is enhanced. By the enhanced signal-to-noise ratio details in the stray light compensated image illustrated in FIG. 4B will be better represented. This is exemplified in FIG. 4B by that the details of the brick wall 205 on the building 220 is better represented as compared with FIG. 4A. The stray light compensation function 142 relay on image data from an image captured by the second imaging device 120 having a field-of-view 121 comprising the light source 220 outside of the field-of-view 111 of the first imaging device 110. Hence, an estimation of stray light in pixels of an image captured by a first imaging device 110 can be made from an image captured by the second imaging device 120.

Figure 5:
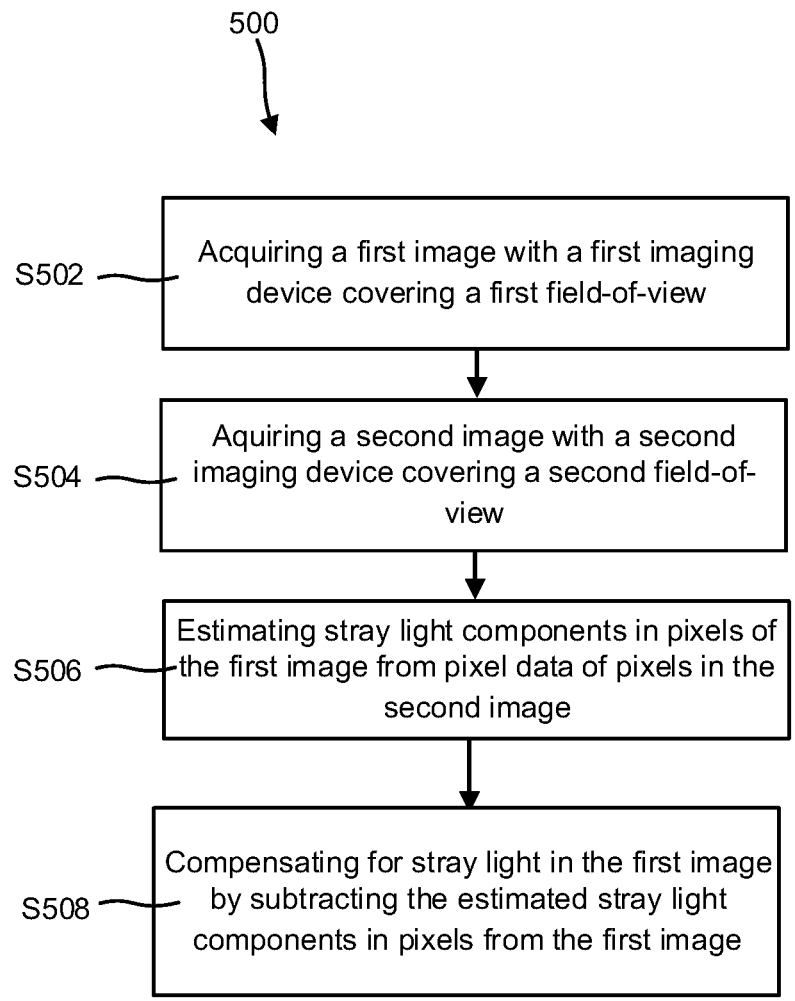
FIG. 5 is a block diagram of a method for stray light compensation.

In connection with FIG. 5 a method 500 for stray light compensation will be discussed. Some of all the steps of the method 500 may be performed by the system 100 described above. However, it is equally realized that some or all of the steps of the method 500 may be performed by one or more other devices having similar functionality. The method 500 comprises the following steps. The steps may be performed in any suitable order.

Acquiring S502 a first image with a first imaging device covering a first field-of-view.

Acquiring S504 a second image with a second imaging device covering a second field-of-view. The second field-of-view is larger than the first field-of-view. The first field-of-view is included in the second field-of-view.

Estimating S506 stray light components in pixels of the first image from pixel data of pixels in the second image. Estimating S506 stray light components in pixels of the first image may comprise: filtering the second image by a series of gaussian filters forming a series of filtered second images; and linearly combining the filtered second images forming a stray light image comprising stray light components from pixels in the first image.

The estimating S506 may further comprise one or more of: determining a portion of the second image overlapping the first image; compensating for a difference in exposure between the second image and the first image; compensating for difference in gain settings of the first imaging device and the second imaging device; compensating for difference in pixel density between the second image and the first image; compensating for difference in view angle between the second image and the first image; and compensating for difference in aperture settings of the first and second imaging devices.

Compensating S508 for stray light in the first image by subtracting the estimated stray light components in pixels of the first image. Thereby an improved first image with a reduction of stray light therein is provided.

The person skilled in the art realizes that the present disclosure by no means is limited to the preferred embodiments described above. On the contrary, many modifications and variations are possible within the scope of the appended claims.

For example, the first and second imaging devices 110, 120 may be configured to capture the first and second images simultaneously. In this context simultaneously shall be understood as that the first and second images have an overlap in time when they are captured. It is however to be understood that one of the images may be captured using a longer exposure time than the other. Typically, the second image is captured using a shorter exposure time than the first image, this in order to avoid overexposure of pixels in the second image. By the simultaneous capturing of the first and second images it is provided that the same lighting conditions are present in both images. This provide for a better quality of the stray light compensation.

Additionally, variations to the disclosed embodiments can be understood and effected by the skilled person in practicing the claimed disclosure, from a study of the drawings, the disclosure, and the appended claims.

The invention claimed is:

1. A method for stray light compensation, the method comprising:
   acquiring a first image with a first imaging device covering a first field-of-view;
   acquiring a second image with a second imaging device covering a second field-of-view, wherein the second field-of-view is larger than the first field-of-view and wherein the first field-of-view is included in the second field-of-view;
   estimating stray light components in pixels of the first image from pixel data of pixels in the second image, wherein estimating stray light components in pixels of the first image comprises:
      filtering the second image by a series of gaussian filters forming a series of filtered second images; and
      linearly combining the filtered second images forming a stray light image comprising stray light components from pixels in the first image; and
   compensating for stray light in the first image by subtracting the estimated stray light components in pixels of the first image.

2. The method according to claim 1, wherein the exposure or saturation level of the second image is lower than the exposure or saturation the first image.

3. The method according to claim 1, wherein estimating stray light components in pixels of the first image comprises determining a portion of the second image overlapping the first image.

4. The method according to claim 1, wherein estimating stray light components in pixels of the first image comprises compensating for a difference in exposure between the second image and the first image.

5. The method according to claim 1, wherein estimating stray light components in pixels of the first image comprises compensating for difference in gain settings of the first imaging device and the second imaging device.

6. The method according to claim 1, wherein estimating stray light components in pixels of the first image comprises compensating for difference in pixel density between the second image and the first image.

7. The method according to claim 1, wherein estimating stray light components in pixels of the first image comprises compensating for difference in view angle between the second image and the first image.

8. A non-transitory computer-readable storage medium having stored thereon instructions for implementing a method for stray light compensation, when executed on a device having processing capabilities, the method comprising:
   acquiring a first image with a first imaging device covering a first field-of-view;
   acquiring a second image with a second imaging device covering a second field-of-view, wherein the second field-of-view is larger than the first field-of-view and wherein the first field-of-view is included in the second field-of-view;
   estimating stray light components in pixels of the first image from pixel data of pixels in the second image, wherein estimating stray light components in pixels of the first image comprises:
      filtering the second image by a series of gaussian filters forming a series of filtered second images; and
      linearly combining the filtered second images forming a stray light image comprising stray light components from pixels in the first image; and
   compensating for stray light in the first image by subtracting the estimated stray light components in pixels of the first image.

9. A system for stray light compensation, the system comprising:
   a first imaging device covering a first field-of-view and being configured to acquire a first image;
   a second imaging device covering a second field-of-view and being configured to acquire a second image, wherein the second field-of-view is larger than the first field-of-view and wherein the first field-of-view is included in the second field-of-view; and
   circuitry configured to execute a stray light compensation function, the stray light compensation function being configured to:
      estimate stray light components in pixels of the first image from pixel data of pixels in the second image, wherein the estimate of the stray light components in the pixels of the first image comprises:
         filtering the second image by a series of gaussian filters forming a series of filtered second images; and
         linearly combining the filtered second images forming a stray light image comprising stray light components from pixels in the first image; and compensate for stray light in the first image by subtracting the estimated stray light components in pixels of the first image.

10. The system according to claim 9, wherein a resolution of the second imaging device is lower than a resolution of the first imaging device.

11. The system according to claim 9, wherein the first and second imaging devices are configured to capture the first and second images simultaneously.

12. The system according to claim 9, wherein the second imaging device is configured to capture the second image so that it is less saturated than the first image.

13. The system according to claim 9, wherein the second imaging device comprises a fixed focal lens arrangement.

14. The system according to claim 9, wherein the second imaging device is separate from the first imaging device.

15. A video camera, including a system for stray light compensation, comprising:
 a first imaging device covering a first field-of-view and being configured to acquire a first image;
 a second imaging device covering a second field-of-view and being configured to acquire a second image, wherein the second field-of-view is larger than the first field-of-view and wherein the first field-of-view is included in the second field-of-view; and
 circuitry configured to execute a stray light compensation function, the stray light compensation function being configured to:
  estimate stray light components in pixels of the first image from pixel data of pixels in the second image, wherein the estimate of the stray light components in the pixels of the first image comprises:
   filtering the second image by a series of gaussian filters forming a series of filtered second images; and
   linearly combining the filtered second images forming a stray light image comprising stray light components from pixels in the first image; and
  compensate for stray light in the first image by subtracting the estimated stray light components in pixels of the first image.

\* \* \* \* \*